US008930590B2

(12) United States Patent
Lim

(10) Patent No.: US 8,930,590 B2
(45) Date of Patent: Jan. 6, 2015

(54) AUDIO DEVICE AND METHOD OF OPERATING THE SAME

(75) Inventor: Kil-Yeon Lim, Hwaseong-si (KR)

(73) Assignee: Samsung Electronics Co., Ltd, Suwon-si, Gyeonggi-do (KR)

( * ) Notice: Subject to any disclaimer, the term of this patent is extended or adjusted under 35 U.S.C. 154(b) by 465 days.

(21) Appl. No.: 13/425,868

(22) Filed: Mar. 21, 2012

(65) Prior Publication Data

US 2012/0246353 A1 Sep. 27, 2012

(30) Foreign Application Priority Data

Mar. 24, 2011 (KR) ........................ 10-2011-0026602

(51) Int. Cl.
*G06F 13/28* (2006.01)
*G06F 3/16* (2006.01)
*G06F 1/32* (2006.01)

(52) U.S. Cl.
CPC *G06F 13/28* (2013.01); *G06F 3/16* (2013.01); *G06F 1/3203* (2013.01)
USPC ................... 710/22; 710/52; 710/62; 710/65; 710/68; 700/94; 704/500; 704/504; 713/320; 713/324

(58) Field of Classification Search
None
See application file for complete search history.

(56) References Cited

U.S. PATENT DOCUMENTS

| 6,088,809 | A * | 7/2000 | Atkinson ...................... 713/324 |
| 6,230,278 | B1 * | 5/2001 | Li et al. ......................... 713/324 |
| 6,266,714 | B1 * | 7/2001 | Jacobs et al. ..................... 710/14 |
| 6,675,233 | B1 * | 1/2004 | Du et al. ......................... 710/14 |
| 6,741,961 | B2 | 5/2004 | Lim |
| 6,954,804 | B2 * | 10/2005 | Lam et al. ....................... 710/14 |
| 7,444,439 | B2 * | 10/2008 | Du et al. ......................... 710/14 |
| 7,505,824 | B2 | 3/2009 | Ebi et al. |
| 7,522,964 | B2 * | 4/2009 | Du et al. ......................... 700/94 |
| 7,522,965 | B2 * | 4/2009 | Chan et al. ...................... 700/94 |

(Continued)

FOREIGN PATENT DOCUMENTS

| JP | 2002-091637 | 3/2002 |
| JP | 2005-130061 | 5/2005 |
| JP | 2006-033204 | 2/2006 |
| KR | 1020020014534 | 2/2002 |

OTHER PUBLICATIONS

'A Low-Cost Audio/Video Decoder Solution for MPEG System Streams' by Charles L. McCarthy, Texas Instruments Inc., 1994.*

(Continued)

*Primary Examiner* — Steven Snyder
(74) *Attorney, Agent, or Firm* — F. Chau & Associates, LLC

(57) ABSTRACT

An audio device and a method of operating the same are provided. The audio device includes a storage unit, a first memory and a second memory, a hardware decoder, a software decoder, a first direct memory access (DMA) block, a second DMA block, and a controller. The controller converts the audio device from an ultra low power mode in which the first PCM information is transmitted to an audio interface buffer through the first memory, the hardware decoder, and the first DMA block or a low power mode in which the second PCM information is transmitted to the audio interface buffer through the second memory, the software decoder, and the first DMA block to a normal mode in which the second PCM information is transmitted to the audio interface buffer through the second memory, the software decoder, and the second DMA block.

20 Claims, 14 Drawing Sheets

(56) References Cited

U.S. PATENT DOCUMENTS

| | | | |
|---|---|---|---|
| 7,522,966 B2* | 4/2009 | Du et al. | 700/94 |
| 7,526,349 B2* | 4/2009 | Chan et al. | 700/94 |
| 7,668,848 B2* | 2/2010 | Burgan et al. | 341/144 |
| 7,818,443 B2* | 10/2010 | Du et al. | 709/231 |
| 8,290,186 B2* | 10/2012 | Jung | 381/311 |
| 8,509,930 B2* | 8/2013 | Cho | 700/94 |
| 8,725,520 B2* | 5/2014 | Yoo et al. | 704/500 |
| 8,738,824 B1* | 5/2014 | Gu et al. | 710/52 |
| 8,762,644 B2* | 6/2014 | Castelloe | 711/118 |
| 2002/0068988 A1* | 6/2002 | Chan et al. | 700/94 |
| 2002/0077713 A1* | 6/2002 | Du et al. | 700/94 |
| 2003/0060911 A1* | 3/2003 | Chan et al. | 700/94 |
| 2003/0088326 A1* | 5/2003 | Du et al. | 700/94 |
| 2006/0069457 A1* | 3/2006 | Malani et al. | 700/94 |
| 2008/0208376 A1* | 8/2008 | Jung | 700/94 |
| 2009/0070119 A1* | 3/2009 | Yoo et al. | 704/500 |
| 2010/0115320 A1* | 5/2010 | Lim et al. | 713/324 |
| 2010/0146158 A1* | 6/2010 | Nishio | 710/22 |
| 2011/0066264 A1* | 3/2011 | Cho | 700/94 |
| 2011/0245946 A1* | 10/2011 | Kim et al. | 700/94 |
| 2011/0268425 A1* | 11/2011 | Glen | 386/272 |
| 2011/0305343 A1* | 12/2011 | Lee et al. | 381/22 |
| 2012/0096223 A1* | 4/2012 | Castelloe | 711/118 |
| 2013/0097442 A1* | 4/2013 | Lin | 713/322 |
| 2013/0103392 A1* | 4/2013 | Son et al. | 704/201 |

OTHER PUBLICATIONS

'An Implemented of H.264 Video Decoder using Hardware and Software' from IEEE 2005 Custom Integrated Circuits Conference, by Seongmo Park et al., copyright 2005, IEEE.*

'Audio Bitstream Coprocessor Architecture Illustration Using MP3 Decoder' White Paper by Fitzgerald J. Archibald et al., Texas Instruments, Aug. 2008.*

* cited by examiner

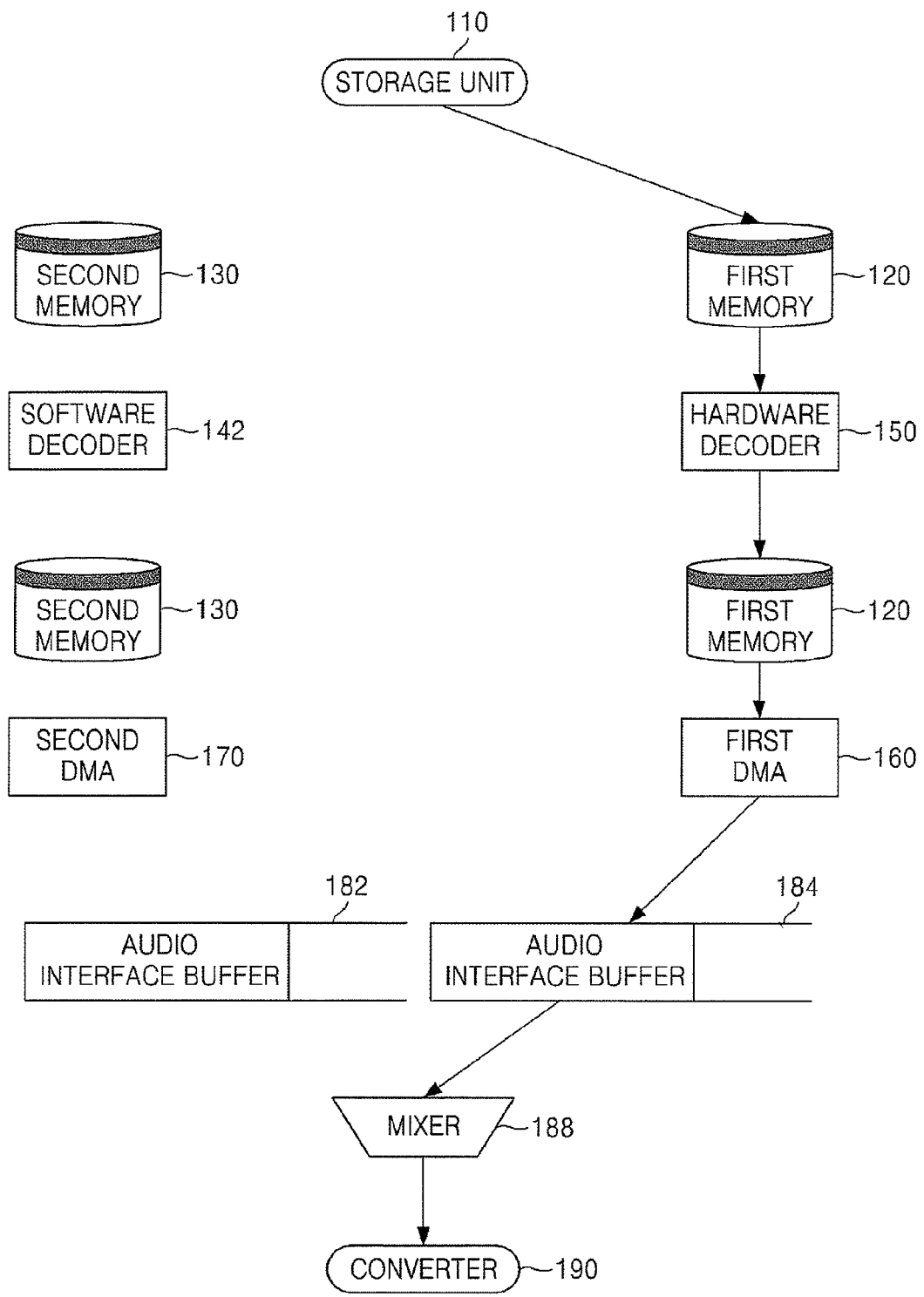

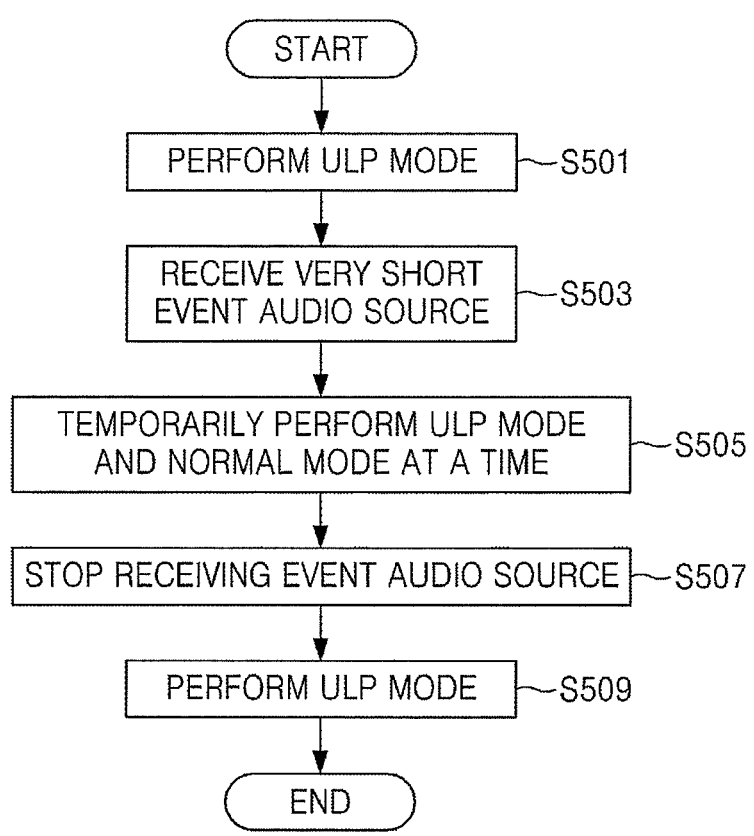

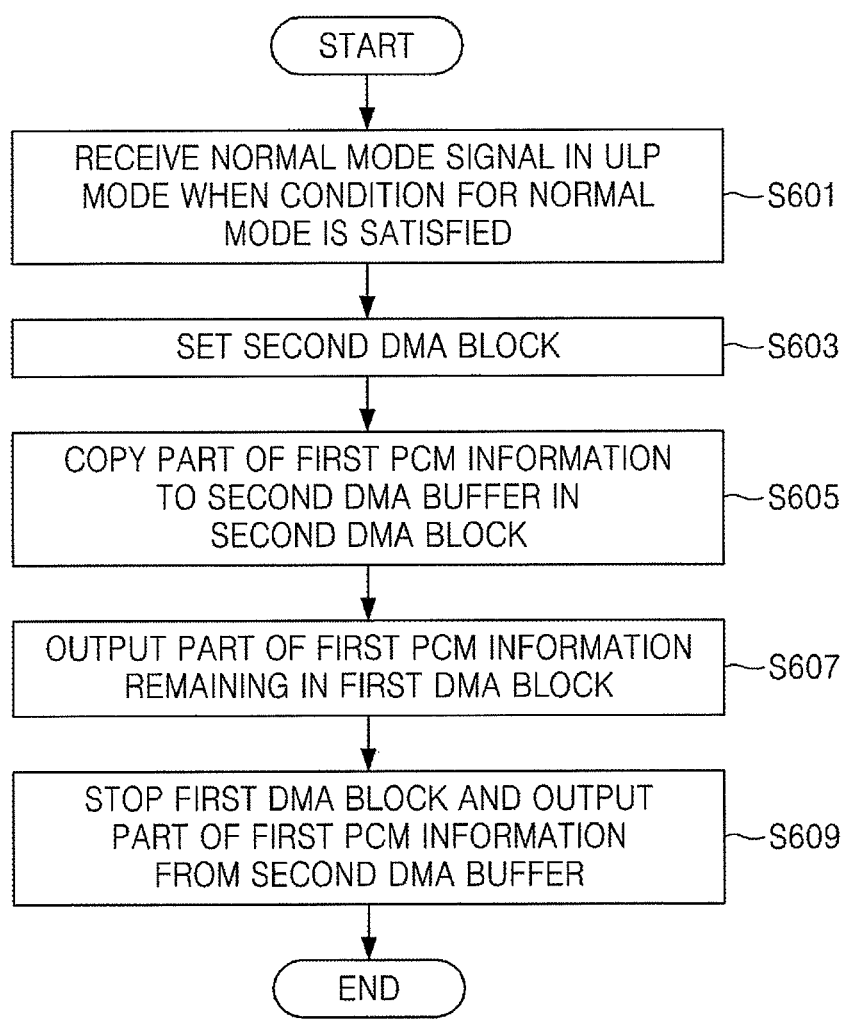

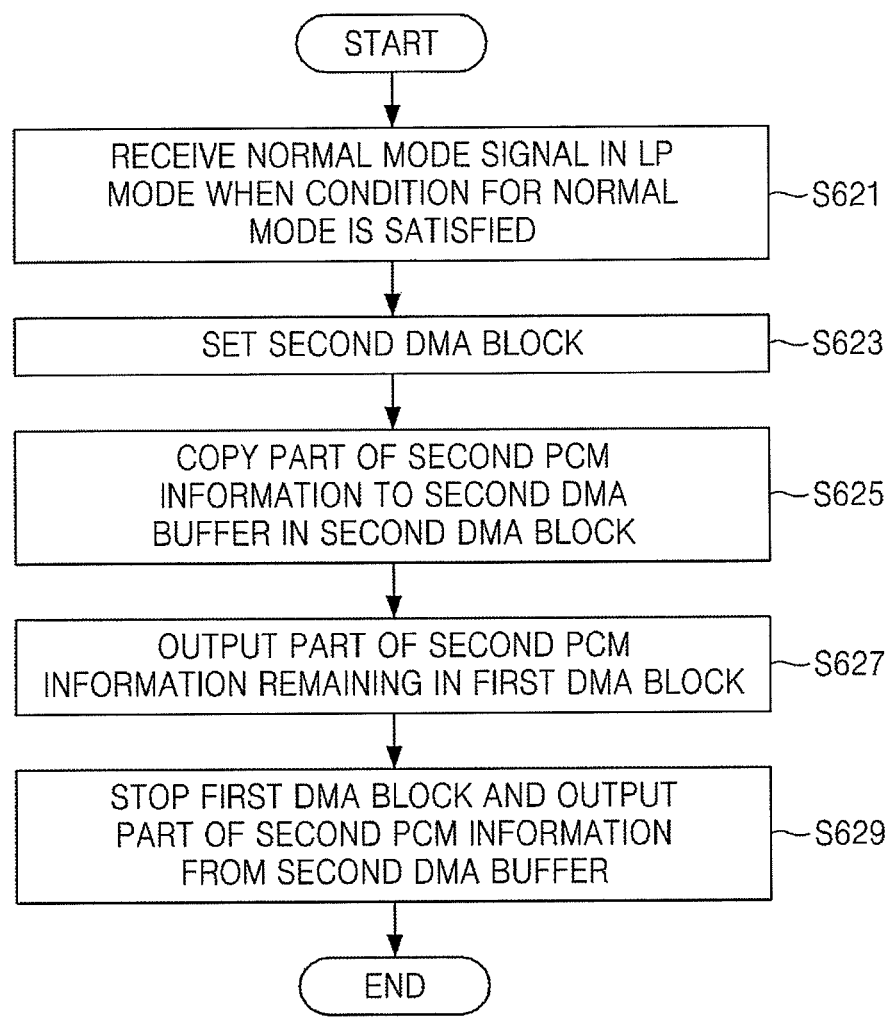

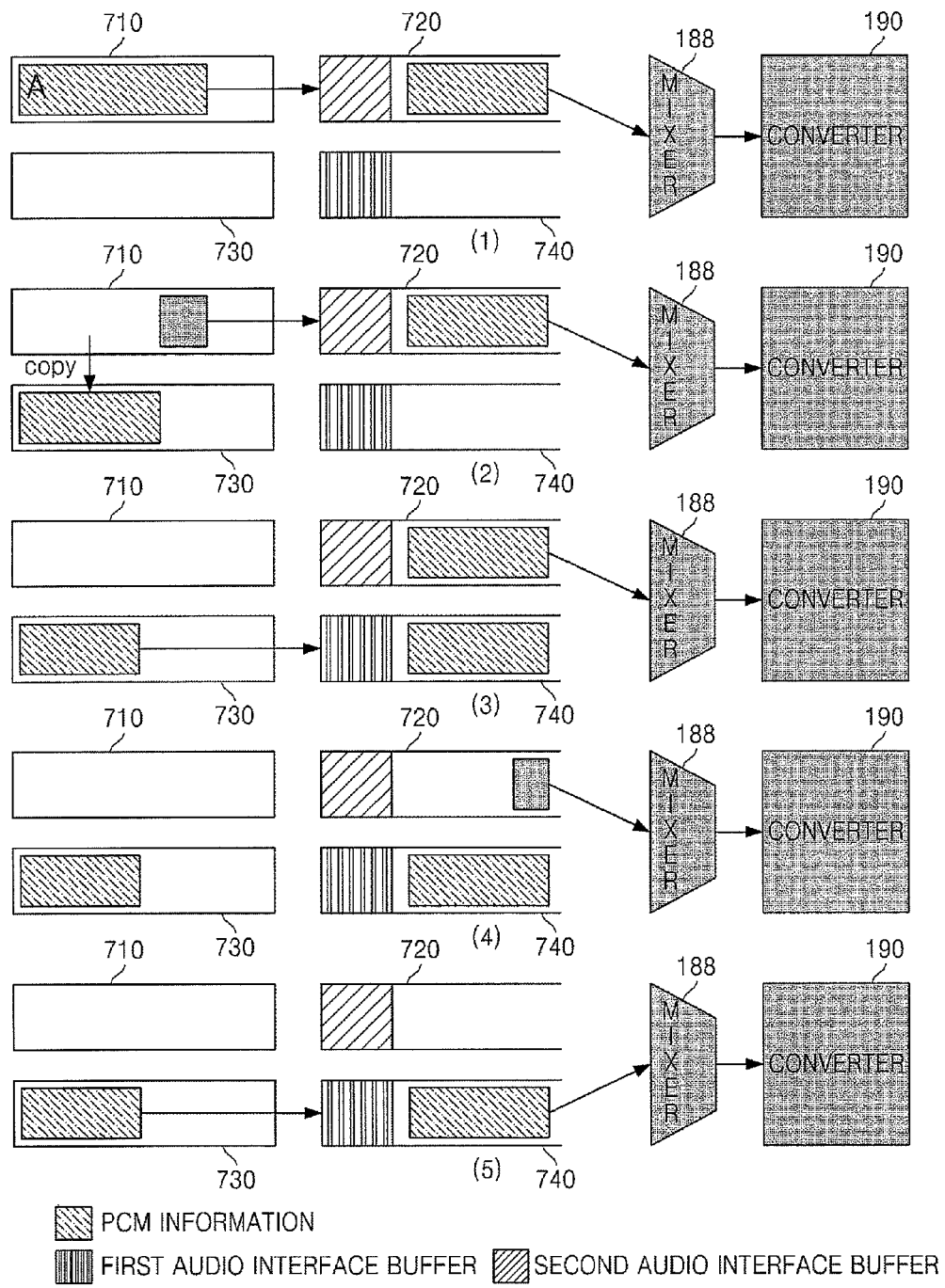

AUDIO DEVICE AND METHOD OF OPERATING THE SAME

CROSS-REFERENCE TO RELATED APPLICATIONS

This application claims priority under 35 U.S.C. §119(a) from Korean Patent Application No. 10-2011-0026602 filed on Mar. 24, 2011, the disclosure of which is hereby incorporated by reference in its entirety.

TECHNICAL FIELD

The embodiments of the present inventive concept relate to a technology for playing audio information in an audio device, and more particularly, to an audio device for realizing real-time audio playback and minimizing power consumption and a method of operating the audio device.

DISCUSSION OF RELATED ART

With the increase of digital conversion products, mobile devices with an audio player function are increasing. However, when these mobile devices play audio files, they consume more power than devices for audio playback only. Accordingly, there is a need for audio devices and methods for playing audio files that can reduce unnecessary power consumption.

SUMMARY

According to an embodiment of the present inventive concept, there is provided an audio device connected with an external output device through an audio interface buffer. The audio device includes a storage unit configured to store audio information; a first memory and a second memory configured to be allocated the audio information; a hardware decoder configured to decode the audio information allocated to the first memory, generate first pulse code modulation (PCM) information, and store the first PCM information in the first memory; a software decoder configured to decode the audio information allocated to the second memory, generate second PCM information, and store the second PCM information in the second memory; a first direct memory access (DMA) block configured to receive the first PCM information from the first memory; a second DMA block configured to receive the second PCM information from the second memory; and a controller configured to control the storage unit, the first memory, the second memory, the hardware decoder, the software decoder, the first DMA block, and the second DMA block.

The controller may convert the audio device from an ultra low power mode in which the first PCM information is transmitted to the audio interface buffer through the first memory, the hardware decoder, and the first DMA block or a low power mode in which the second PCM information is transmitted to the audio interface buffer through the second memory, the software decoder, and the first DMA block to a normal mode in which the second PCM information is transmitted to the audio interface buffer through the second memory, the software decoder, and the second DMA block.

When the controller converts the audio device from the ultra low power mode to the normal mode, the controller may set the second DMA block, copy part of the first PCM information to a second DMA buffer included in the second DMA block, transmit the first PCM information except for the part copied to the second DMA buffer to the audio interface buffer, and transmit the part of the first PCM information copied to the second DMA buffer to the audio interface buffer.

The amount of the part of the first PCM information copied to the second DMA buffer may be greater than $(n-2)*m$ and less than $(n-1)*m$, where "n" is the number of internal buffers included in the second DMA buffer and "m" is the size of each internal buffer.

When the controller converts the audio device from the low power mode to the normal mode, the controller may set the second DMA block, copy part of the second PCM information to a second DMA buffer included in the second DMA block, transmit the second PCM information except for the part copied to the second DMA buffer to the audio interface buffer, and transmit the part of the second PCM information copied to the second DMA buffer to the audio interface buffer.

The amount of the part of the first PCM information copied to the second DMA buffer may be greater than $(n-2)*m$ and less than $(n-1)*m$, where "n" is the number of internal buffers included in the second DMA buffer and "m" is the size of each internal buffer.

A time difference between completion of the ultra low power mode or the low power mode and commencement of the normal mode may be less than a duration predetermined according to a size of the audio interface buffer and a type of the audio information.

When the ultra low power mode is converted to the normal mode, the controller may convert the audio device from the normal mode to the low power mode.

When the low power mode is converted to the normal mode, the controller may convert the audio device from the normal mode to the ultra low power mode.

When converting the audio device from the normal mode to the low power mode or the ultra low power mode, the controller may set the first DMA block, copy part of the second PCM information to a first DMA buffer included in the first DMA block, transmit the second PCM information except for the part copied to the first DMA buffer to the audio interface buffer, and transmit the part of the second PCM information copied to the first DMA buffer to the audio interface buffer.

The amount of the part of the second PCM information copied to the first DMA buffer may be greater than $(l-2)*k$ and less than $(l-1)*k$, where "l" is the number of internal buffers included in the first DMA buffer and "k" is the size of each internal buffer.

A time difference between completion of the normal mode and commencement of the ultra low power mode or the low power mode may be less than a duration predetermined according to a size of the audio interface buffer and a type of the audio information.

According to an embodiment of the present inventive concept, there is provided a method of operating an audio device connected with an external output device through an audio interface buffer.

The method includes performing an ultra low power mode or a low power mode, wherein in the ultra low power mode, first PCM information generated by decoding audio information allocated to a first memory using a hardware decoder is stored in the first memory and the first PCM information is transmitted to the audio interface buffer through a first DMA block, and in the low power mode, second PCM information generated by decoding audio information allocated to a second memory using a software decoder is stored in the first memory and the second PCM information is transmitted to the audio interface buffer through the first DMA block; and converting the audio device from the ultra low power mode or the low power mode to a normal mode in which the second PCM information is stored in the second memory and the second PCM information is transmitted to the audio interface buffer through a second DMA block.

BRIEF DESCRIPTION OF THE DRAWINGS

The embodiments of the present inventive concept will become more apparent by the detailed description with reference to the attached drawings in which:

FIGS. 4A through 4C are diagrams showing flows of audio information in different modes;

FIGS. 5A through 5C are flowcharts illustrating methods of operating an audio device according to embodiments of the present inventive concept;

FIGS. 6 and 7 are diagrams showing procedures for converting a playback mode.

DETAILED DESCRIPTION OF THE EMBODIMENTS

Figure 1:
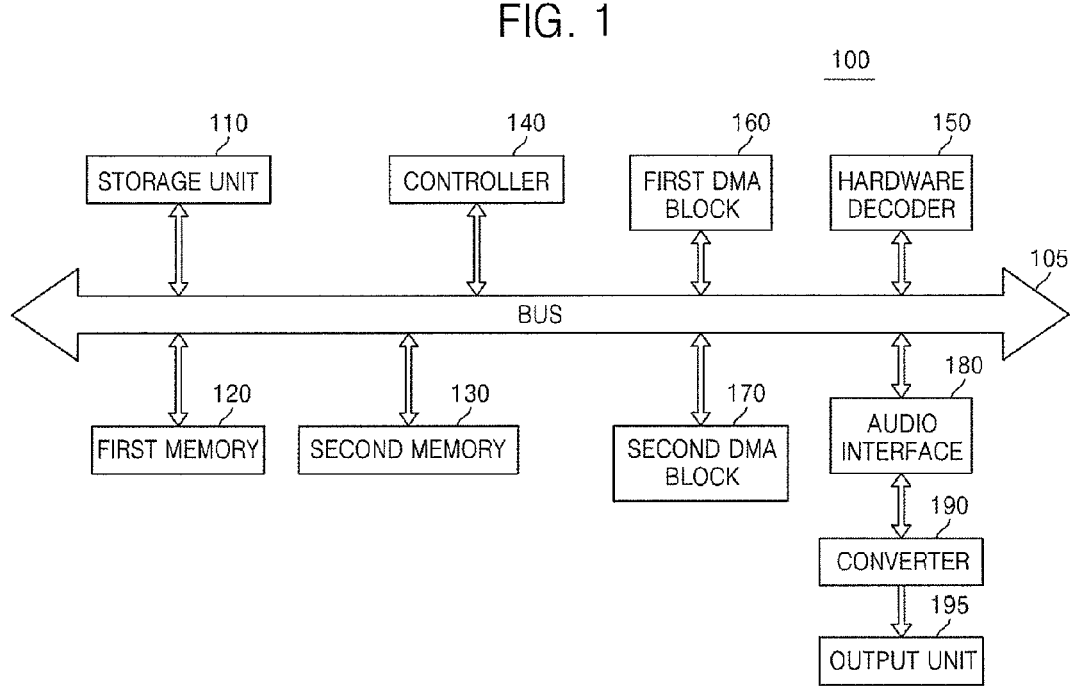
FIG. 1 is a block diagram illustrating an audio device according to an embodiment of the present inventive concept.

The present inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers may refer to like or similar elements throughout the specification and the drawings.

It will be understood that when an element is referred to as being "connected" or "coupled" to another element, it can be directly connected or coupled to the other element or intervening elements may be present. As used herein, the singular forms "a", "an" and "the" are intended to include the plural forms as well, unless the context clearly indicates otherwise.

Figure 2:
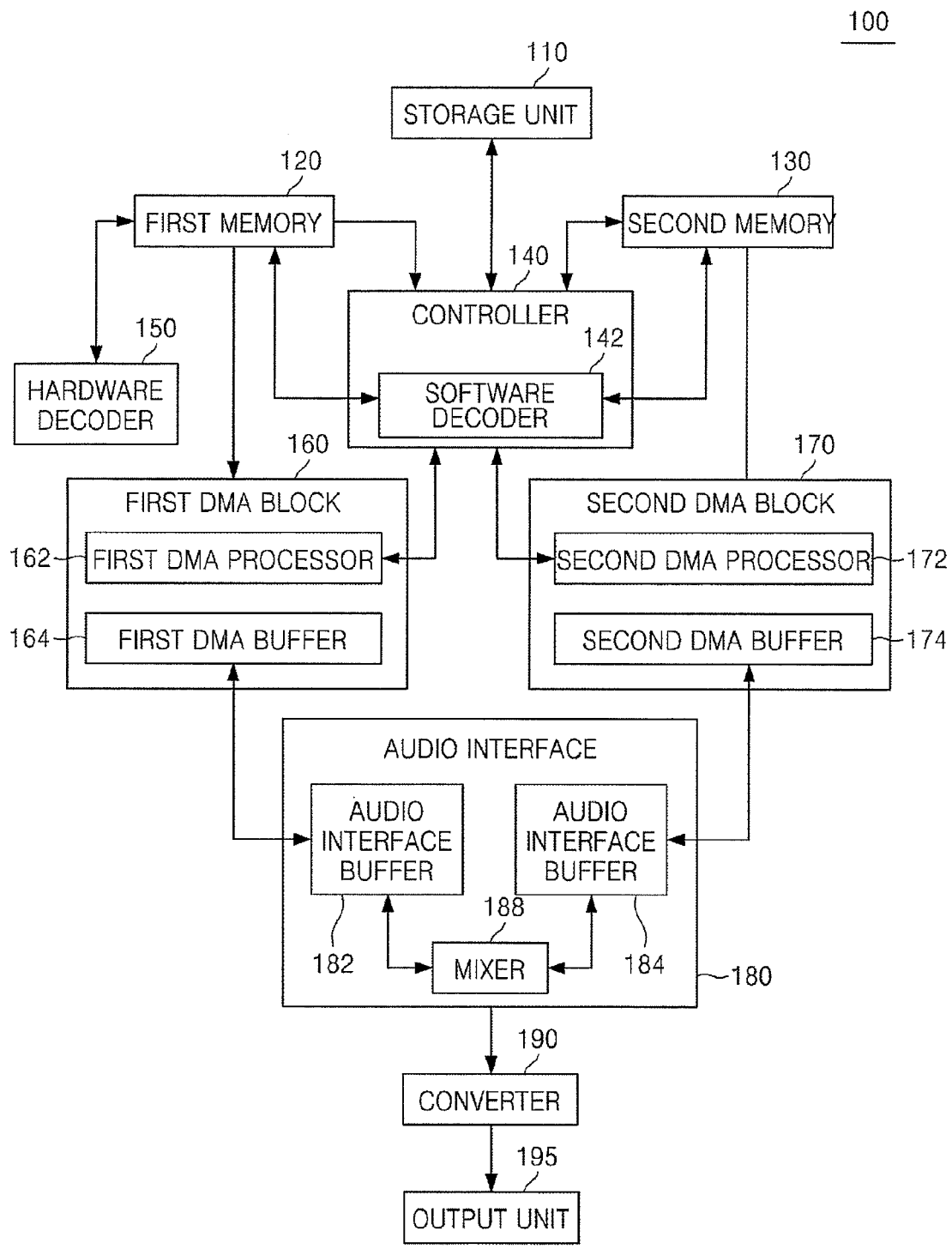
FIG. 2 is a diagram illustrating connections between internal elements in the audio device illustrated in FIG. 1.

FIG. 1 is a block diagram illustrating an audio device 100 according to an embodiment of the present inventive concept. FIG. 2 is a diagram illustrating connections between internal elements in the audio device 100 illustrated in FIG. 1.

Referring to FIGS. 1 and 2, the audio device 100 includes a storage unit 110, a first memory 120, a second memory 130, a controller 140, a hardware decoder 150, a first direct memory access (DMA) block 160, a second DMA block 170, an audio interface 180, a converter 190, and an output unit 195.

The storage unit 110 stores multiple items of audio information that may have, but not limited to, formats, such as ringtone, MP3, advanced audio coding (AAC), and enhanced variable rate codec (EVRC). The storage unit 110 may be an auxiliary memory device that stores programs or various types of data. The storage unit 110 may be, but not limited to, a magnetic disk or a flash memory.

The first memory 120 is for audio information only. The first memory 120 has low power consumption and fast speed. One of the items of audio information stored in the storage unit 110 may be allocated to the first memory 120. The first memory 120 may be, but not limited to, a static random access memory (SRAM).

Unlike the first memory 120, the second memory 130 may be used for general purposes and may execute audio information allocated by the storage unit 110.

The second memory 130 may be a read only memory (ROM), a programmable ROM (PROM), an erasable programmable ROM (EPROM), an electrically erasable programmable ROM (EEPROM), a flash memory, a ferroelectric random access memory (FRAM), a magnetic random access memory (MRAM), a phase-change random access memory (PRAM), a nano random access memory (NRAM), a silicon-oxide-nitride-oxide-silicon (SONOS), a resistive memory, or a racetrack memory.

Audio information stored in the storage unit 110 may be decoded and mixed and then stored in the second memory 130. The second memory 130 may include a program region for storing programs, a region for storing input data, a region for storing output data, and a task region for executing a task and storing an interim result of the task.

The controller 140 may be a central processing unit (CPU) and control the operations of the elements of the audio device 100.

In detail, the controller 140 may allocate audio information stored in the storage unit 110 to the first memory 120 or the second memory 130 according to a playback mode. The controller 140 may include a software decoder 142 to generate second pulse code modulation (PCM) information by decoding the audio information allocated to the second memory 130. The second PCM information may be stored in the second memory 130.

The hardware decoder 150 decodes audio compression formats such as MP3 and AAC. The hardware decoder 150 may perform post processing, such as sound effects, mixing, sampling frequency conversion, and channel conversion, on audio information and reduce power consumption. The hardware decoder 150 may have higher efficiency than the software decoder 142 of the controller 140 at the same clock.

The first DMA block 160 is for audio information only and may include a first DMA processor 162 and a first DMA buffer 164. When the first PCM information decoded by the hardware decoder 150 is stored in the first memory 120, the first DMA block 160 may include at least one first DMA buffer 164 to store the first PCM information temporarily stored in the first memory 120. The first PCM information stored in the first DMA buffer 164 may be output through the audio interface 180 and the converter 190.

DMA is used to address a problem that when the controller 140 executes a command by reading the command from the second memory 130 and storing the command in a register, the controller 140 cannot execute another command. A main memory like the second memory 130 has a slow speed and monopolizes the controller 140 during the execution of the command. In other words, DMA is used to process a command copied by the controller 140 in place of the controller 140, thereby increasing the performance and the efficiency of a system.

The second DMA block 170 is used for general purposes and may include a second DMA processor 172 and a second DMA buffer 174. The second PCM information stored in the second DMA buffer 174 may be output through the audio interface 180 and the converter 190.

The first DMA buffer 164 and the second DMA buffer 174 may be, but not limited to, ring buffers. According to an embodiment, the first DMA block 160 is independently provided, and as a consequence, the operation of the first DMA block 160 continues even when all operations except for playback of audio information are turned off.

The audio interface 180 is a transceiver and may include, but not limited to, an inter-integrated circuit (IIC) sound ($I^2S$) interface, an AC97, or a PCM interface. The audio interface 180 may include a plurality of audio interface buffers 182 and 184 and a mixer 188. The audio interface 180 transmits and receives a clock signal to and from the converter 190 while operating.

The audio interface buffers 182 and 184 receive the first PCM information and the second PCM information, respectively, from the first and second DMA buffers 164 and 174, respectively. The first PCM information and the second PCM information may be processed by the mixer 188 and then transmitted to the converter 190.

A system bus can be more efficiently used when each item of audio information is moved whenever transmitted than when items of audio information are collected and moved at a time. For efficiency, first-input first-output (FIFO) buffers may be used for the audio interface buffers 182 and 184, with the use of DMA.

Whenever the audio interface 180 receives PCM information from the first and second DMA buffers 164 and 174, the audio interface 180 immediately transmits the PCM information to the converter 190 using the FIFO buffers.

The mixer 188 may control the operations of the audio interface buffers 182 and 184. In detail, when both of the audio interface buffers 182 and 184 are full of information, the mixer 188 may transmit information from only one of the buffers 182 and 184. Alternatively, the mixer 188 may mix all information from both of the audio interface buffers 182 and 184 and may transmit the mixed information. When only one of the audio interface buffers 182 and 184 is full of information, the mixer 188 may immediately transmit the information to the converter 190.

The converter 190 converts PCM information from a digital format to an analog format and generates an audio signal that can be heard by humans and outputs the audio signal through the output unit 195.

The elements shown in FIG. 1 are connected via a bus 105. The transmission and storage of a command or audio information may be performed through the bus 105. The operation of each element during the playback of an audio file is described below.

Figure 3:
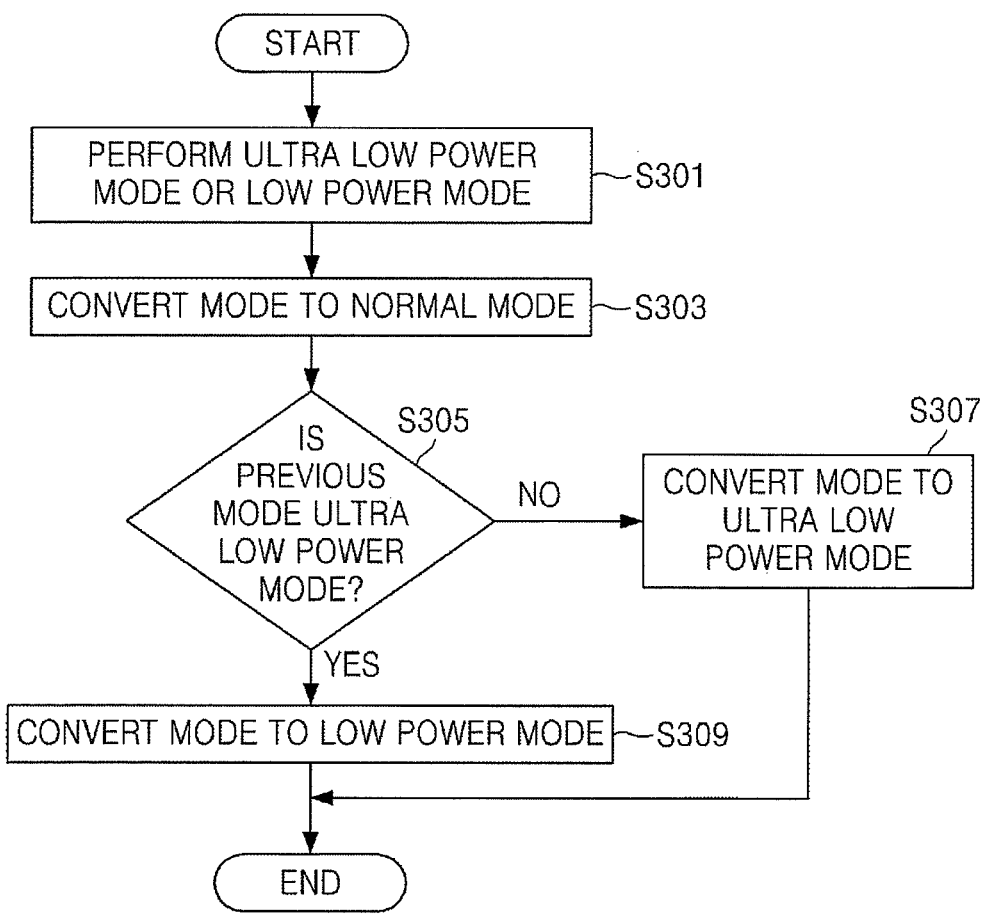
FIG. 3 is a flowchart illustrating a method of operating an audio device according to an embodiment of the present inventive concept.

FIG. 3 is a flowchart illustrating a method of operating the audio device 100 according to an embodiment of the present inventive concept.

The controller 140 may control the overall operation of a mobile device with multiple functions as well as playback of the audio device 100. When the mobile device uses a device for display, executes a program, or accesses the Internet, even when the mobile device performs audio information playback only, unnecessary power consumption increases.

To address this problem, the controller 140 of the audio device 100 may operate in a playback mode, such as a low power mode or an ultra low power mode, when audio information is played.

The controller 140 may control audio information to be played in the low power mode. In the low power mode, the audio device 100 allocates a plurality of items of audio information stored in the storage unit 110 to the second memory 130, decodes the audio information allocated to the second memory 130 using the software decoder 142 in the controller 140 and generates second PCM information, stores the second PCM information in the first memory 120, and then transmits the second PCM information to the audio interface 180 through the first DMA block 160.

When the operation of a device, e.g., a video device, other than the audio device 100 is not required, the first memory 120, the audio interface 180; and the first DMA block 160 may cut off the power of a power domain corresponding to the video device.

In a normal mode, the audio device 100 allocates a plurality of items of audio information stored in the storage unit 110 to the second memory 130, decodes the audio information allocated to the second memory 130 using the software decoder 142 in the controller 140 and generates second PCM information, stores the second PCM information in the second memory 130, and then transmits the second PCM information to the audio interface 180 through the second DMA block 170.

In the ultra low power mode, the audio device 100 allocates the first memory 120 one item of audio information among a plurality of items of audio information stored in the storage unit 110, decodes the item of audio information allocated to the first memory 120 using the hardware decoder 150 and generates first PCM information, stores the first PCM information in the first memory 120, and transmits the first PCM information to the audio interface 180 through the first DMA block 160.

Differences among the low power mode, the normal mode and the ultra low power mode lie in the routes through which audio information goes. Differences in power consumption among the routes depend on how much a power domain of a device, e.g., a video device, other than the audio device 100 is separated from a power domain of the audio device 100. When devices other than the audio device 100 are separated from the power domain of the audio device 100, the devices other than the audio device 100 are turned off when only audio information is played, so that power consumption is reduced.

The controller 140 may control the audio device 100 to operate in the low power mode and convert the mode of the audio device 100 into the normal mode or the ultra low power mode when a certain event occurs or a predetermined condition is satisfied.

However, the first memory 120 storing PCM information and the first DMA block 160 are used in common in the low power mode and the ultra low power mode, and firmware is downloaded in the first memory 120 for operating the hardware decoder 150 and then audio information is copied in the first memory 120 to operate the audio device 100 in the ultra low power mode. As a consequence, it may be difficult to make direct conversion between the low power mode and the ultra low power mode since the first memory 120 and the first DMA block 160 are already being used in the low power mode.

The controller 140 controls the audio device 100 to operate in the ultra low power mode or the low power mode in operation 5301. Thereafter, when a predetermined condition is satisfied, the controller 140 controls the audio device 100 to convert from the ultra low power mode or the low power mode to the normal mode in operation 5303 and to operate in the normal mode or to enter into the low power mode or the ultra low power mode. The controller 140 determines whether a playback mode performed just before the normal mode is the ultra low power mode in operation S305. When the controller 140 determines that the previous playback mode is the ultra low power mode, the controller 140 controls the audio device 100 to convert to the low power mode in operation S309. When the controller 140 determines that the previous playback mode is the low power mode, the controller 140 controls the audio device 100 to convert to the ultra low power mode in operation S307.

When temporary playback of audio information is performed in the ultra low power mode, the controller 140 may control the audio device 100 to convert to the normal mode or the low power mode. However, since it may be inefficient to convert the playback mode for temporary playback of the audio information and to convert the playback mode back to the ultra low power mode after the temporary playback is completed, the ultra low power mode and the normal mode may be temporarily performed at a time.

For example, when the audio information is played in the ultra low power mode, only a single audio source can be played since the first memory 120 for audio information only has small capacity unlike the second memory 130. It may be inefficient to convert the playback mode for a small capacity of audio information such as an event audio source. For these reasons, the controller 140 may control the audio device 100 to temporarily operate in the normal mode and the ultra low power mode at a time when it is necessary to play a small capacity of audio information, such as, for example, when there is a user's activity.

The capacity of the first memory 120 may be increased to address the problems arising due to the small capacity of the first memory 120, but it may be uneconomical to increase the capacity of the first memory 120 when the first memory 120 cannot be used for general purposes.

The second memory 130 may be used together with the first memory 120. However, since the second memory 130 has a large capacity for general purposes and thus has large power consumption, the ultra low power mode may not be realized when only audio information is played.

The embodiments of the present inventive concept can address the above-described problems.

Figure 4B:
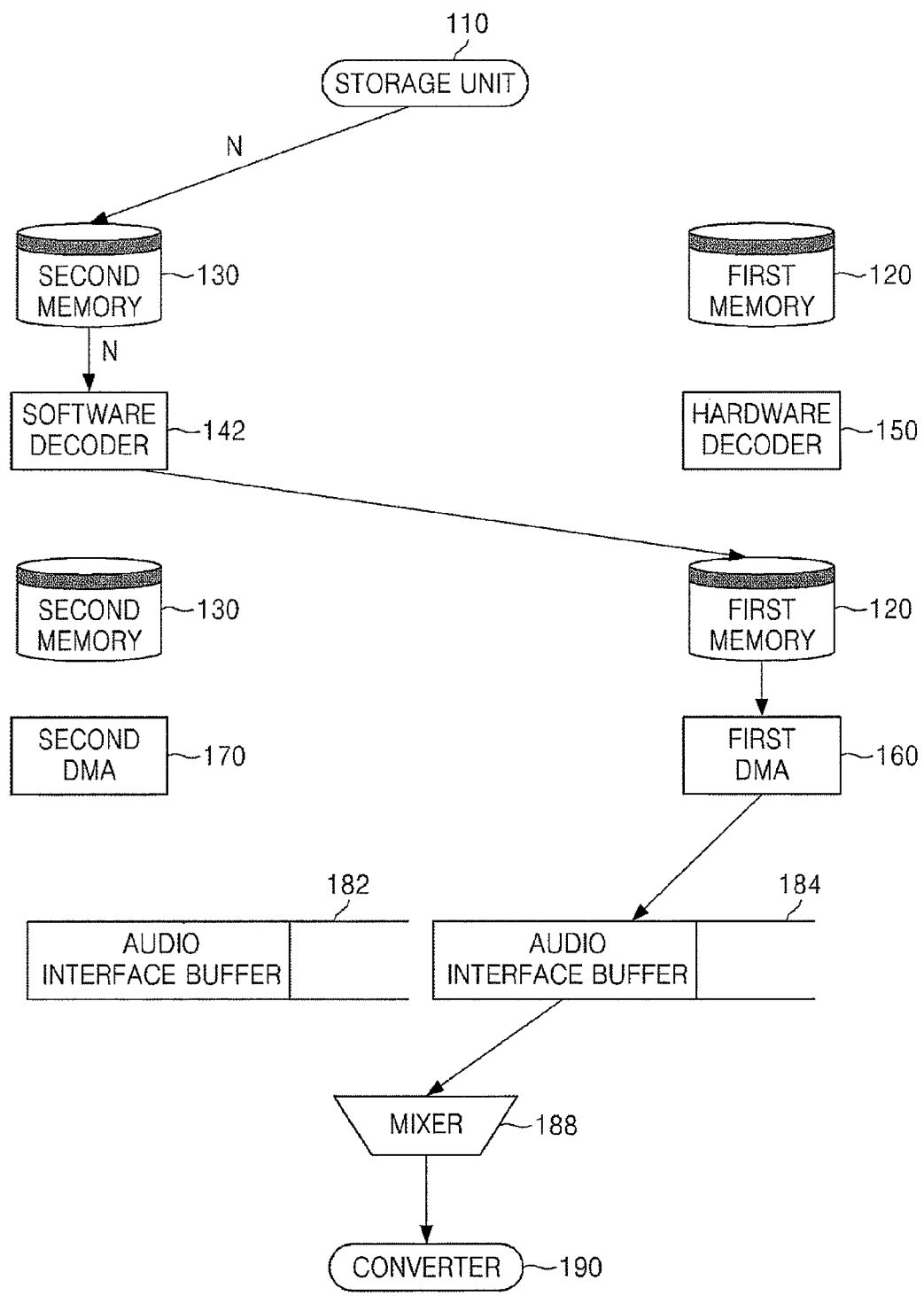
Figure 4C:
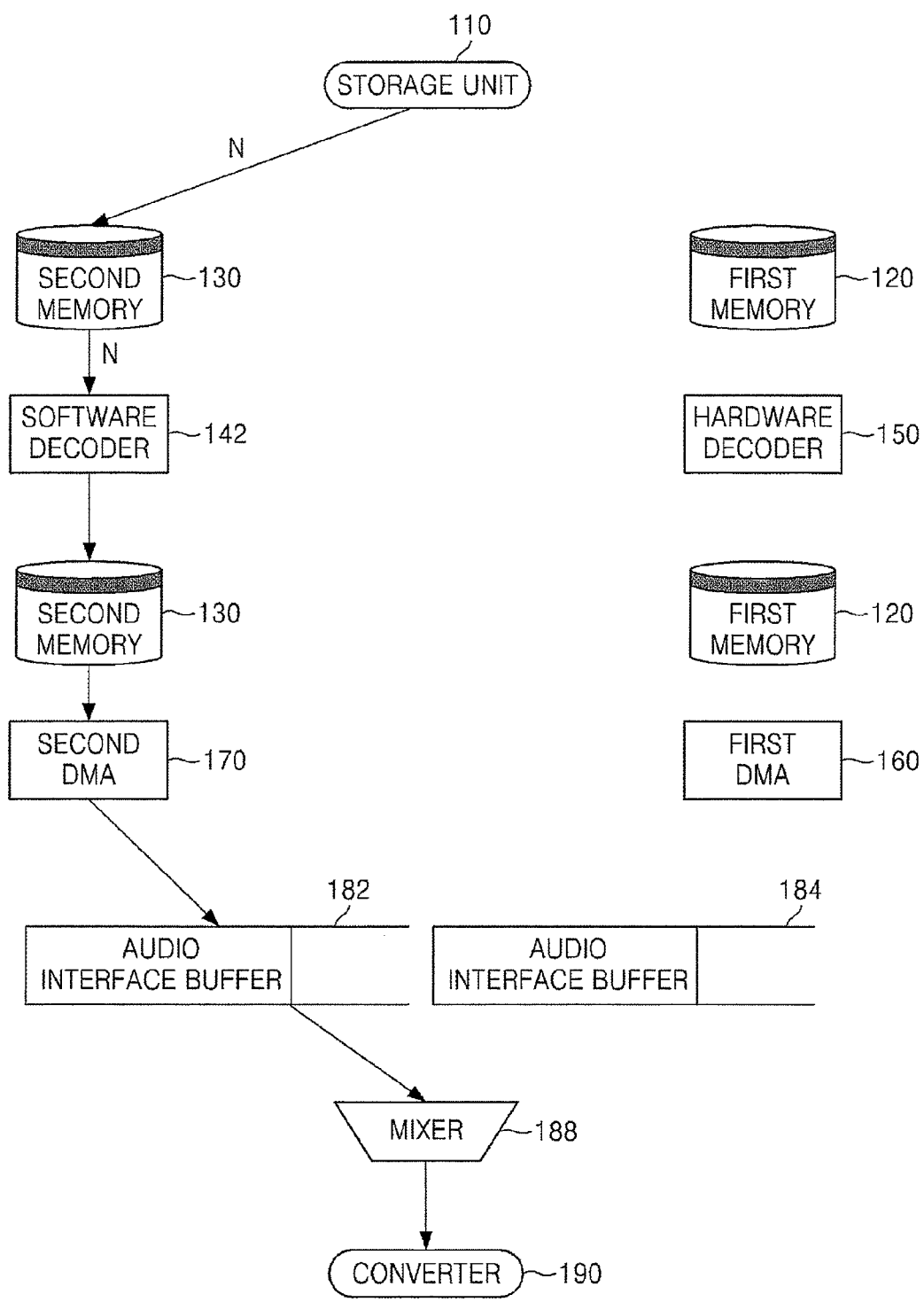

FIGS. 4A through 4C are diagrams showing flows of audio information in different playback modes.

FIG. 4A shows a flow of audio information in the ultra low power (ULP) mode.

The controller 140 copies and allocates only one of a plurality of audio information items stored in the storage unit 110 to the first memory 120 in the ULP mode. The controller 140 controls the single audio information item to be decoded by the hardware decoder 150 to generate first PCM information. The controller 140 stores the first PCM information in the first memory 120. The controller 140 stores the first PCM information stored in the first memory 120 in a first DMA buffer 164 within the first DMA block 160. The controller 140 piles up the first PCM information, which is temporarily stored in the first DMA buffer 164, in the audio interface buffer 184 and outputs an analog signal of the audio information through the output unit 195, such as a speaker.

FIG. 4B shows a flow of audio information in the low power (LP) mode.

The controller 140 copies and allocates a plurality of audio information items stored in the storage unit 110 to the second memory 130 in the LP mode. The controller 140 controls the audio information items to be decoded by the software decoder 142 in the controller 140 to generate second PCM information.

The controller 140 stores the second PCM information in the first memory 120. The controller 140 stores the second PCM information stored in the first memory 120 in the first DMA buffer 164 in the first DMA block 160. The controller 140 stores the second PCM information, which is temporarily stored in the first DMA buffer 164, in the audio interface buffer 184 and outputs an analog signal of the audio information through the output unit 195.

FIG. 4C shows a flow of audio information in the normal mode.

The controller 140 copies and allocates a plurality of audio information items stored in the storage unit 110 to the second memory 130 in the normal mode. The controller 140 controls the audio information items to be decoded by the software decoder 142 in the controller 140 to generate second PCM information. The controller 140 stores the second PCM information in the second memory 130. The controller 140 stores the second PCM information, which is stored in the second memory 130, in a second DMA buffer 174 included in the second DMA block 170. The controller 140 transmits the second PCM information temporarily stored in the second DMA buffer 174 to the audio interface buffer 182 and outputs an analog signal of the audio information through the output unit 195.

Figure 5B:
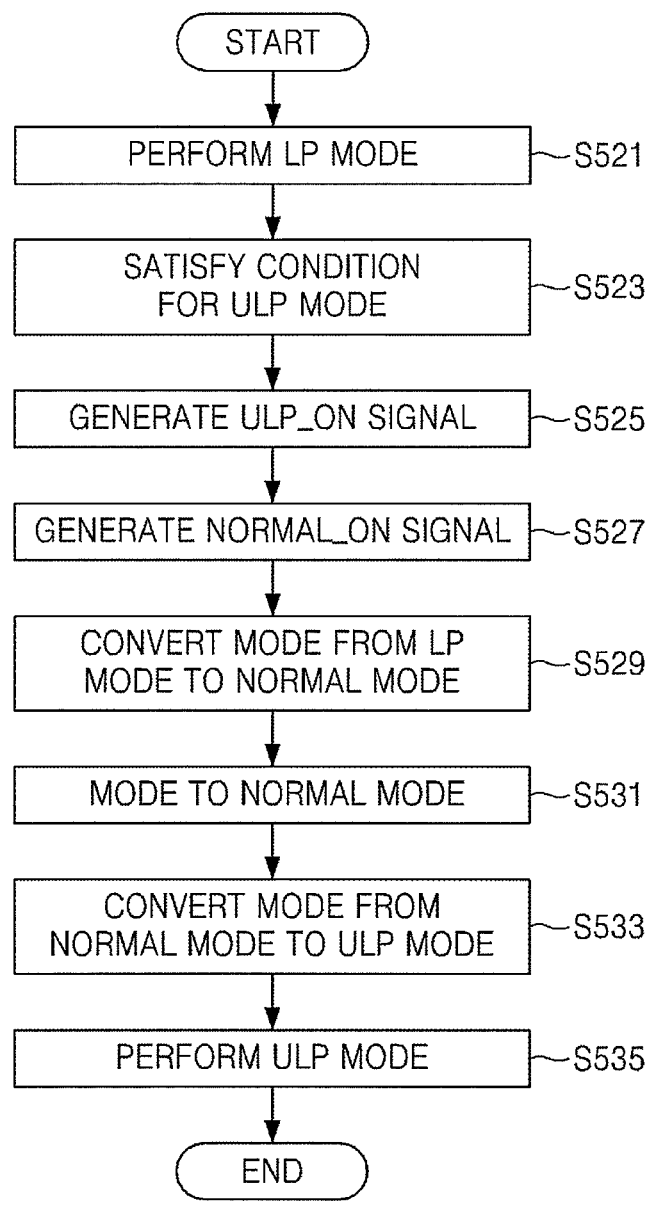
Figure 5C:
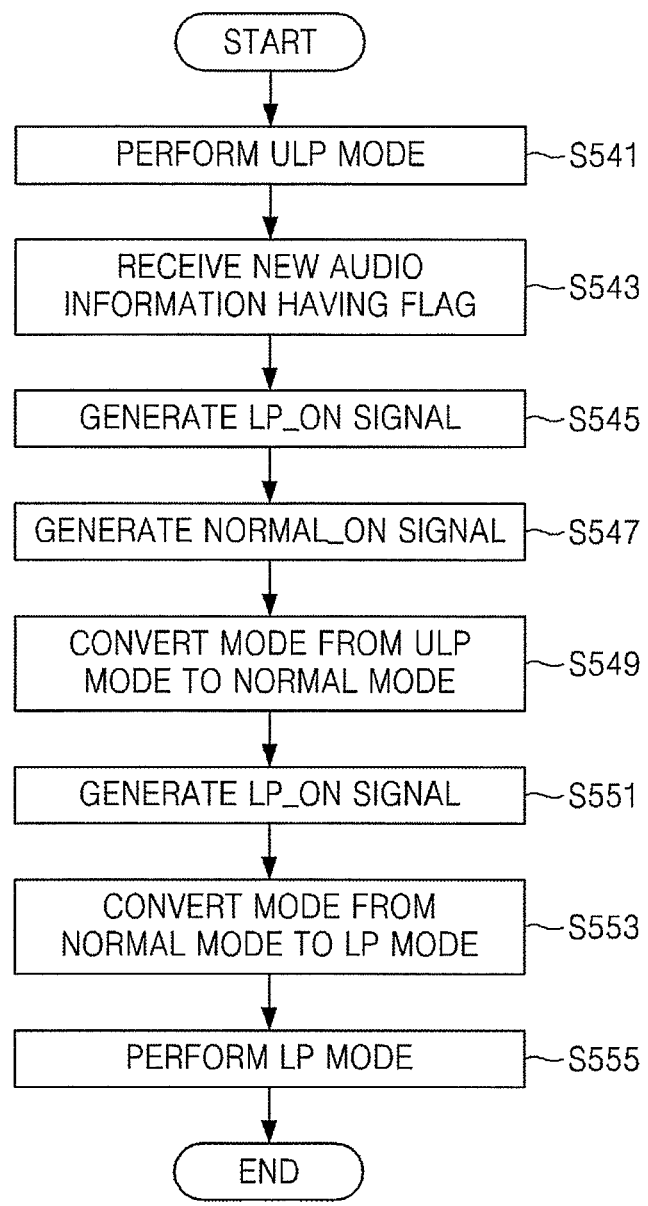

FIGS. 5A through 5C are flowcharts illustrating methods of operating the audio device 100 in different modes according to embodiments of the present inventive concept.

FIG. 5A is a flowchart illustrating a method of temporarily operating the audio device 100 in the ULP mode and the normal mode.

For purposes of illustration, the audio device 100 operates in the ULP mode in operation S501. There may be an input from a user or an audio source other than an audio source that is currently being played in the ULP mode may be played in operation S503. For example, different audio sources may be played at a time in multimedia devices with multiple functions.

For instance, a sound may be made when there is a text message, an incoming call, or an input by a user's operation on a keypad in a mobile phone while a music file is played in the mobile phone. As described above, it is inefficient to convert the ULP mode to the normal mode or the LP mode when an event audio source played for a very short period of time is generated. Accordingly, the controller 140 controls the audio device 100 to temporarily operate in both of the ULP mode and the normal mode at a time in operation S505.

When playback of the event audio source ends in operation S507, the controller 140 controls the audio device 100 to operate in the ULP mode in operation S509. Therefore, power consumption is minimized when a separate event audio source is played.

FIG. 5B is a flowchart illustrating a method of converting the audio device 100 from the LP mode to the ULP mode.

For purposes of illustration, the audio device 100 operates in the LP mode in operation S521. When a condition for the ULP mode, such as playback of only one audio source, is satisfied in operation S523 while the audio device 100 is operating in the LP mode, a ULP_ON signal is generated in operation S525.

When the ULP_ON signal is generated in the LP mode, conversion from the LP mode to the ULP mode is requested. Direct conversion between the LP mode and the ULP mode may not be performed since resources may not be redundantly allocated, so a Normal_ON signal is generated in operation S527.

The controller 140 converts the playback mode from the LP mode to the normal mode in response to the Normal_ON signal in operation S529. Thereafter, the controller 140 sets the ULP mode in operation S531. Thereafter, the ULP_ON signal is generated again and the normal mode is converted to the ULP mode in response to the ULP_ON signal in operation S533. Thereafter, the ULP mode is performed in operation S535.

FIG. 5C is a flowchart illustrating a method of converting the audio device 100 from the ULP mode to the LP mode.

For purposes of illustration, the audio device 100 operates in the ULP mode in operation S541.

When new audio information having a flag signal is received in the ULP mode in operation S543, an LP_ON signal is generated in operation S545. When the LP_ON signal is generated in the ULP mode, conversion from the ULP mode to the LP mode is requested.

Direct conversion between the LP mode and the ULP mode may not be performed since resources may not be redundantly allocated, so a Normal_ON signal is generated in operation S547. The controller 140 converts the playback mode from the ULP mode to the normal mode in response to the Normal_ON signal in operation S549.

Thereafter, the controller 140 sets the LP mode in operation S551. Thereafter, the LP_ON signal is generated again, and the normal mode is converted to the LP mode in response to the LP_ON signal in operation S553. Thereafter, the LP mode is performed in operation S555.

FIGS. 6 and 7 are diagrams showing procedures for converting the playback mode.

Figure 6C:
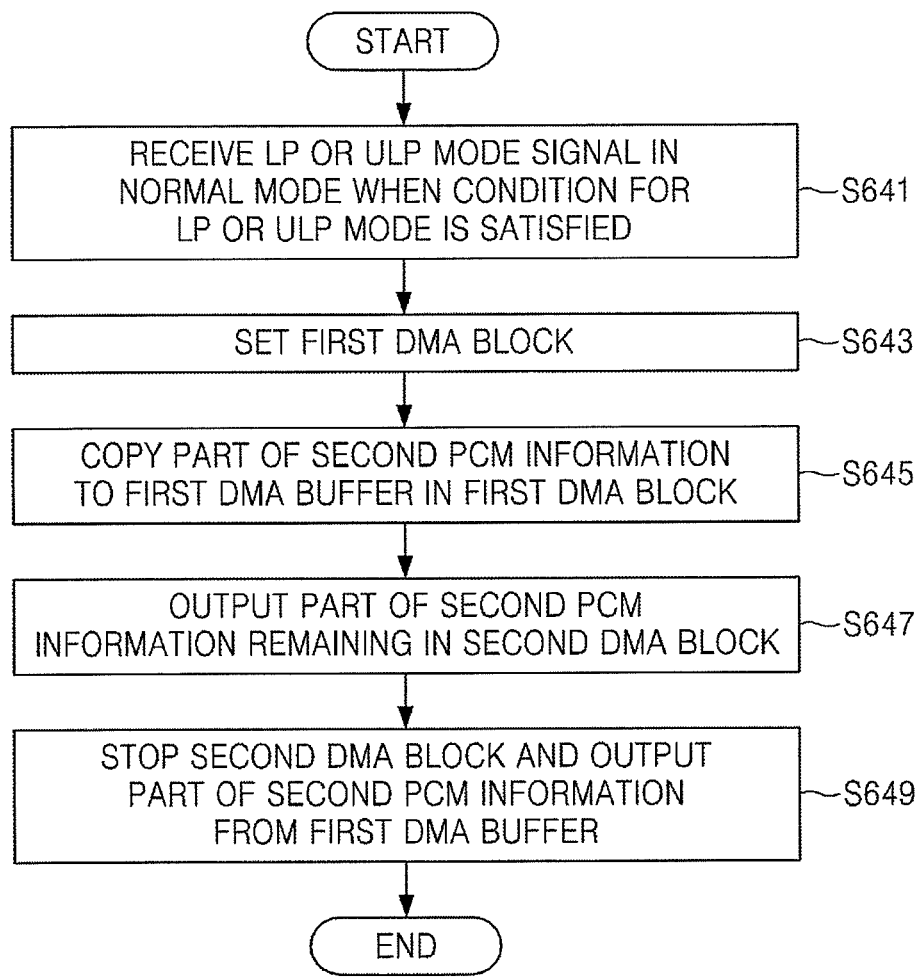

FIG. 6A is a flowchart illustrating a procedure for converting the playback mode from the ULP mode to the normal mode. FIG. 6B is a flowchart illustrating a procedure for converting the playback mode from the LP mode to the normal mode. FIG. 6C is a flowchart illustrating a procedure for converting the playback mode from the normal mode to the ULP mode or the LP mode.

Referring to FIG. 6A, when a normal mode signal, i.e., a Normal_ON signal is received in the ULP mode in operation 5601 as a condition for the normal mode is satisfied, the controller 140 calculates a setup time of the second DMA buffer 174 to change a playback route from the first DMA block 160 temporarily storing first PCM information in the ULP mode to the second DMA block 170.

After calculating the setup time, the controller 140 sets the second DMA block 170 in operation 5603 to operate the second DMA block 170. To maintain real-time playback of audio information during the setup time, the controller 140 defines the amount of part of the first PCM information to be transmitted from the first DMA buffer 164 and copies the first PCM information except for the defined amount of part of the first PCM information to the second DMA buffer 174 in operation S605. In operation 5607, the controller 140 outputs the part of the first PCM information remaining in the first DMA buffer 164 except for the first PCM information copied. Thereafter, the controller 140 stops the first DMA block 160 and outputs the first PCM information in the second DMA buffer 174 in operation 5609.

Referring to FIG. 6B, when the Normal_ON signal is received in the LP mode in operation 5621 since the condition for the normal mode is satisfied, the controller 140 calculates a setup time of the second DMA buffer 174 to change the playback route from the first DMA block 160 temporarily storing second PCM information in the LP mode to the second DMA block 170. After calculating the setup time, the controller 140 sets the second DMA block 170 in operation 5623 to operate the second DMA block 170. To maintain real-time playback of audio information during the setup time, the controller 140 defines the amount of part of the second PCM information to be transmitted from the first DMA buffer 164 and copies the second PCM information except for the defined amount of part of the second PCM information to the to the second DMA buffer 174 in operation S625. In operation S627, the controller 140 outputs the part of the second PCM information remaining in the first DMA buffer 164 except for the second PCM information copied. Thereafter, the controller 140 stops the first DMA block 160 and outputs the second PCM information in the second DMA buffer 174 in operation 5629.

Referring to FIG. 6C, when a condition for the ULP or LP mode is satisfied, a ULP signal (ULP_ON signal) or an LP signal (LP_ON signal) is received in the normal mode in operation S641. The controller 140 calculates a setup time of the first DMA buffer 164 to change the playback route from the second DMA block 170 temporarily storing second PCM information in the normal mode to the first DMA block 160. After calculating the setup time, the controller 140 sets the first DMA block 160 in operation 5643 to operate the first DMA block 160. To maintain real-time playback of audio information during the setup time, the controller 140 defines the amount of part of the second PCM information to be continuously transmitted from the second DMA buffer 174 and copies the second PCM information except for the defined amount of part of the second PCM information to the first DMA buffer 164 in operation 5645. In operation S647, the controller 140 outputs the part of the second PCM information remaining in the second DMA buffer 174 except for the second PCM information copied. Thereafter, the controller 140 stops the second DMA block 170 and outputs the second PCM information from the first DMA buffer 164 in operation S649.

Referring to FIG. 7, the playback mode changes in order of steps (1) to (5). These steps (1) to (5) may be applied to any procedure in which the playback mode changes from one mode to another.

An audio interface buffer may be a FIFO buffer.

In step (1), PCM information is transmitted from a DMA buffer 710 to a second audio interface buffer 720. Two audio interface buffers 720 and 740 are illustrated in FIG. 7, but the embodiments of the present inventive concept are not restricted thereto. Among the two audio interface buffers 720 and 740, only one audio interface buffer 720 is full of information, and therefore, the mixer 188 transmits the information from the audio interface buffer 720 to the converter 190, as described above.

In step (2), part of the PCM information that has not been transmitted from the DMA buffer 710 to the second audio interface buffer 720 is copied to another DMA buffer 730. Not all of the part of the PCM information that has not been transmitted from the DMA buffer 710 to the second audio interface buffer 720 is copied to the DMA buffer 730, but a predetermined amount of the PCM information remains in the DMA buffer 710 to achieve real-time playback. In detail, the amount of the PCM information remaining in the DMA buffer 710 is determined by a period of time taken to copy the part of the PCM information to the DMA buffer 730 and a period of time taken to set a DMA block including the DMA buffer 730 and transmit the part of the PCM information to the DMA buffer 730.

In step (3), all of the part of the PCM information remaining in the DMA buffer 710 is completely transmitted to the second audio interface buffer 720 and then the PCM information copied to the DMA buffer 730 is transmitted to the first audio interface buffer 740. While the PCM information is transmitted from the DMA buffer 730 to the first audio interface buffer 740, the PCM information in the second audio interface buffer 720 is transmitted to the converter 190 through the mixer 188 and then output.

In step (4), after the PCM information stored in the second audio interface buffer 720 is transmitted to the mixer 188, the PCM information stored in the first audio interface buffer 740 is sequentially transmitted to the mixer. A switch between the audio interface buffers 720 and 740 is controlled by the mixer 188.

In step (5), the DMA buffer 730 resumes transmission of the PCM information to the first audio interface buffer 740 before all the information stored in the first audio interface buffer 740 is transmitted to the converter 190.

Duration from the stop of a DMA block including the DMA buffer 710 to the start of the DMA block including the DMA buffer 730 depends on the size of the audio interface buffers 720 and 740 and may have a value obtained by dividing the size of the audio interface buffers 720 and 740 by a sampling rate. For instance, the duration may be about 1.4 ms for a 44.1 K/16-bit stereo device. For example, a time difference between the completion of one mode and the commencement of another mode may be determined by the size of the audio interface buffers 720 and 740 and the type of audio information, and according to an embodiment, may be controlled to be less than a predetermined period of time.

When the playback mode is changed, this duration may secure time for executing a code for performing DMA in a different mode and updating variables to accomplish real-time playback of audio information.

In this duration, PCM information is copied and setting is made for the operation of a new DMA buffer. Through this operation, the type of DMA used in a playback mode may be changed and the playback mode may be accordingly changed.

The DMA blocks each including the DMA buffers 710 and 730 may be the first and second DMA blocks 160 and 170 illustrated in FIG. 1. The first and second audio interface buffers 740 and 720 may be the audio interface buffers 182 and 184 illustrated in FIG. 1.

Figure 8:
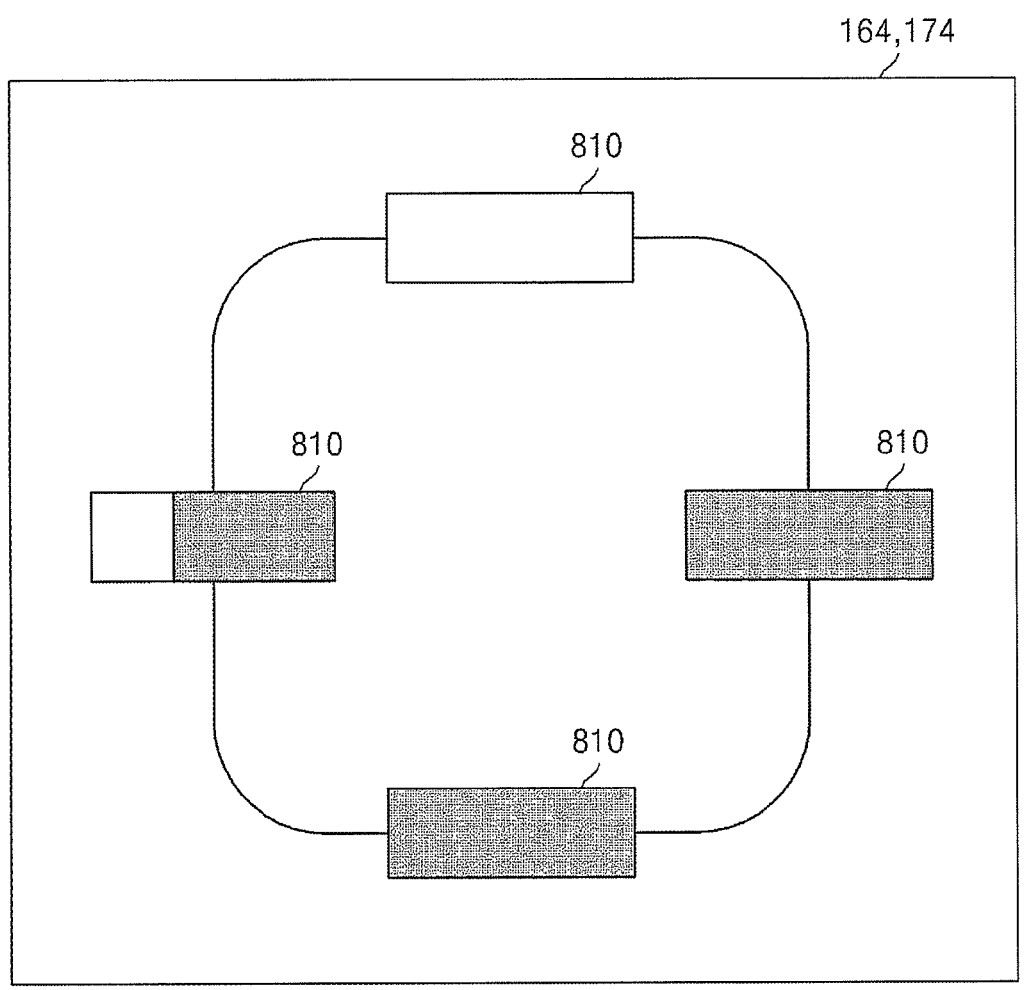
FIG. 8 is a diagram showing the amount of pulse code modulation (PCM) information queued for transmission when a plurality of direct memory access (DMA) buffers exist.

FIG. 8 is a diagram showing the amount of PCM information queued for transmission in a DMA buffer implemented as a ring buffer.

The first and second DMA buffers 164 and 174 illustrated in FIG. 2 may include a plurality of internal buffers 810 in a ring format so that information is seamlessly transmitted in the DMA buffers 164 and 174. The amount of information queued for transmission after completion of mixing is more than (n−2)*m and less than (n−1)*m, where "n" is the number of DMA buffers 810 and "m" is the size of each DMA buffer 810.

Referring to FIG. 8, when the number of buffers 810 in the DMA buffer 164 or 174 is 4 and the size of each DMA buffer 810 is "m", the amount of PCM information copied to the DMA buffer 164 or 174 is more than 2 m and less than 3 m.

As a consequence, buffer management is accomplished so that the flow of audio information is not interrupted while the audio information is played.

As described above, according to the embodiments of the present inventive concept, dynamic conversion may be accomplished among a ULP mode which has low power consumption but has a problem with post processing, an LP mode which has medium power consumption and enables post processing, and a normal mode which has high power consumption, so that a playback mode appropriate to conditions is selectively performed.

Since the playback mode is performed in accordance with the conditions, power consumption is minimized. In addition, since the playback mode is dynamically changed, audio information is seamlessly played in real time.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

What is claimed is:

1. An audio device comprising:
an audio interface buffer configured to interface an external output device;
a storage unit configured to store audio information;
a first memory and a second memory configured to be allocated the audio information;
a hardware decoder configured to decode the audio information allocated to the first memory, generate first pulse code modulation (PCM) information, and store the first PCM information in the first memory;
a software decoder configured to decode the audio information allocated to the second memory, generate second PCM information, and store the second PCM information in the second memory;
a first direct memory access (DMA) block configured to receive the first PCM information from the first memory;
a second DMA block configured to receive the second PCM information from the second memory; and
a controller configured to control the storage unit, the first memory, the second memory, the hardware decoder, the software decoder, the first DMA block, and the second DMA block,
wherein the controller converts the audio device from an ultra low power mode in which the first PCM information is transmitted to the audio interface buffer through the first memory, the hardware decoder, and the first DMA block or a low power mode in which the second PCM information is transmitted to the audio interface buffer through the second memory, the software decoder, and the first DMA block to a normal mode in which the second PCM information is transmitted to the audio interface buffer through the second memory, the software decoder, and the second DMA block.

2. The audio device of claim 1, wherein when the controller converts the audio device from the ultra low power mode to the normal mode, the controller is configured to set the second DMA block, copy part of the first PCM information to a second DMA buffer comprised in the second DMA block, transmit the first PCM information except for the part copied to the second DMA buffer to the audio interface buffer, and transmit the part of the first PCM information copied to the second DMA buffer to the audio interface buffer.

3. The audio device of claim 2, wherein the amount of the part of the first PCM information copied to the second DMA buffer is greater than (n−2)*m and less than (n−1)*m, where "n" is the number of internal buffers comprised in the second DMA buffer and "m" is a size of each internal buffer.

4. The audio device of claim 1, wherein when the controller converts the audio device from the low power mode to the normal mode, the controller is configured to set the second DMA block, copy part of the second PCM information to a second DMA buffer comprised in the second DMA block, transmit the second PCM information except for the part copied to the second DMA buffer to the audio interface buffer, and transmit the part of the second PCM information copied to the second DMA buffer to the audio interface buffer.

5. The audio device of claim 4, wherein the amount of the part of the first PCM information copied to the second DMA buffer is greater than (n−2)*m and less than (n−1)*m, where "n" is the number of internal buffers comprised in the second DMA buffer and "m" is a size of each internal buffer.

6. The audio device of claim 1, wherein a time difference between completion of the ultra low power mode or the low power mode and commencement of the normal mode is less than duration predetermined according to a size of the audio interface buffer and a type of the audio information.

7. The audio device of claim 1, wherein when the ultra low power mode is converted to the normal mode, the controller is configured to convert the audio device from the normal mode to the low power mode, and when the low power mode is converted to the normal mode, the controller is configured to convert the audio device from the normal mode to the ultra low power mode.

8. The audio device of claim 7, wherein when converting the audio device from the normal mode to the low power mode or the ultra low power mode, the controller is configured to set the first DMA block, copy part of the second PCM information to a first DMA buffer comprised in the first DMA block, transmit the second PCM information except for the part copied to the first DMA buffer to the audio interface buffer, and transmit the part of the second PCM information copied to the first DMA buffer to the audio interface buffer.

9. The audio device of claim 8, wherein the amount of the part of the second PCM information copied to the first DMA buffer is greater than (l−2)*k and less than (l−1)*k, where "l" is the number of internal buffers comprised in the first DMA buffer and "k" is a size of each internal buffer.

10. The audio device of claim 7, wherein a time difference between completion of the normal mode and commencement of the ultra low power mode or the low power mode is less than duration predetermined according to a size of the audio interface buffer and a type of the audio information.

11. A method of operating an audio device connected with an external output device through an audio interface buffer, the method comprising:

performing an ultra low power mode or a low power mode, wherein in the ultra low power mode, first pulse code modulation (PCM) information generated by decoding audio information allocated to a first memory using a hardware decoder is stored in the first memory and the first PCM information is transmitted to the audio interface buffer through a first direct memory access (DMA) block and in the low power mode, second PCM information generated by decoding audio information allocated to a second memory using a software decoder is stored in the first memory and the second PCM information is transmitted to the audio interface buffer through the first DMA block; and converting the audio device from the ultra low power mode or the low power mode to a normal mode in which the second PCM information is stored in the second memory and the second PCM information is transmitted to the audio interface buffer through a second DMA block.

12. The method of claim 11, wherein converting the audio device from the ultra low power mode to the normal mode comprises:

setting the second DMA block;
copying part of the first PCM information to a second DMA buffer comprised in the second DMA block;
transmitting the first PCM information remaining in the first DMA block to the audio interface buffer; and
stopping the first DMA block and transmitting the part of the first PCM information copied to the second DMA buffer to the audio interface buffer.

13. The method of claim 11, wherein converting the audio device from the low power mode to the normal mode comprises:

setting the second DMA block;
copying part of the second PCM information to a second DMA buffer comprised in the second DMA block;
transmitting the second PCM information remaining in the first DMA block to the audio interface buffer; and
stopping the first DMA block and transmitting the part of the second PCM information copied to the second DMA buffer to the audio interface buffer.

14. The method of claim 11, wherein a time difference between completion of the ultra low power mode or the low power mode and commencement of the normal mode is less than duration predetermined according to a size of the audio interface buffer and a type of the audio information.

15. The method of claim 11, further comprising:

converting the audio device from the normal mode to the low power mode when the ultra low power mode is converted to the normal mode; and
converting the audio device from the normal mode to the ultra low power mode when the low power mode is converted to the normal mode.

16. The method of claim 15, wherein converting the audio device from the normal mode to the low power mode or the ultra low power mode comprises:

setting the first DMA block;
copying part of the second PCM information to a first DMA buffer comprised in the first DMA block;
transmitting the second PCM information remaining in the second DMA block to the audio interface buffer; and
stopping the second DMA block and transmitting the part of the second PCM information copied to the first DMA buffer to the audio interface buffer.

17. A device comprising:

an interface buffer configured to interface an output device;
a storage unit configured to store audio information;
a first memory configured to receive the audio information from the storage unit in a first power mode;
a second memory configured to receive the audio information from the storage unit in a second or third power mode;
a first decoder configured to decode the audio information from the first memory into first pulse code modulation (PCM) information in the first power mode, wherein the first PCM information is stored in the first memory;
a second decoder configured to decode the audio information from the second memory into second PCM in the second or third power mode, wherein the second PCM information is stored in the first memory in the second power mode and stored in the second memory in the third power mode;
a first direct memory access (DMA) block configured to receive the first PCM information from the first memory in the first power mode and to receive the second PCM information from the first memory in the second power mode;
a second DMA block configured to receive the second PCM information from the second memory in the third power mode; and
a controller configured to control the storage unit, the first and second memory, the first and second decoder, and the first and second DMA block according to each of the first, second, or third power mode.

18. The device of claim 17, wherein the controller is configured to perform mode switching between the first or second power mode and the third power mode.

19. The device of claim 17, wherein the controller is configured to perform the first power mode and third power mode at the same time or to perform the second power mode and third power mode at the same time.

20. The device of claim 17, wherein the first power mode is an ultra low power mode, the second power mode is a low power mode, and the third power mode is a normal mode.

\* \* \* \* \*